United States Patent
Hong (10) Patent No.: US 12,200,798 B2
(45) Date of Patent: Jan. 14, 2025

(54) METHODS AND APPARATUSES FOR REPORTING ERROR CAUSE

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 17/605,960

(22) PCT Filed: Apr. 25, 2019

(86) PCT No.: PCT/US2019/084276
§ 371 (c)(1),
(2) Date: Oct. 22, 2021

(87) PCT Pub. No.: WO2020/215273
PCT Pub. Date: Oct. 29, 2020

(65) Prior Publication Data
US 2024/0188161 A1    Jun. 6, 2024

(51) Int. Cl.
*H04W 76/19*    (2018.01)
*H04W 76/18*    (2018.01)

(52) U.S. Cl.
CPC .......... *H04W 76/19* (2018.02); *H04W 76/18* (2018.02)

(58) Field of Classification Search
CPC . H04W 76/19; H04W 76/18; H04W 36/0033; H04W 28/04; H04W 48/02;
(Continued)

(56) References Cited

U.S. PATENT DOCUMENTS

| | | | |
|---|---|---|---|
| 9,609,683 B2* | 3/2017 | Kaikkonen | H04W 76/19 |
| 2008/0092149 A1* | 4/2008 | Rowbotham | G06F 9/451 |
| | | | 719/321 |
| 2014/0213210 A1* | 7/2014 | Li | H04B 1/12 |
| | | | 455/296 |
| 2014/0220981 A1 | 8/2014 | Jheng et al. | |

(Continued)

FOREIGN PATENT DOCUMENTS

| CN | 101621865 A | 1/2010 |
|---|---|---|
| CN | 103517454 A | 1/2014 |

(Continued)

OTHER PUBLICATIONS

State Intellectual Property Office of the People's Republic of China, Office Action and Search Report Issued in Application No. 201980000742.5, Jan. 13, 2022, 11 pages. (Submitted with Machine/Partial Translation).

(Continued)

*Primary Examiner* — Mewale A Ambaye
(74) *Attorney, Agent, or Firm* — Arch & Lake LLP (57) ABSTRACT

Methods and apparatuses for reporting an error cause are provided. A method includes: after establishing a radio resource control (RRC) connection with a first base station, detecting whether the RRC connection is disconnected due to execution of a target operation; where the first base station is a base station accessed by a first SIM card of the terminal, and the target operation is an operation executed by a second SIM card in an idle state in the terminal; if the RRC connection is disconnected, recording that a target error cause of disconnecting the RRC connection is resulted from the target operation. The terminal may record the target error cause of disconnecting the RRC connection with the first base station due to the target operation to subsequently enable the first base station not to perform recovery for the target error cause any longer, thus reducing network errors statistics.

7 Claims, 6 Drawing Sheets

(58) Field of Classification Search
CPC ....... H04W 36/30; H04W 76/00; H04W 8/18; H04W 24/04; H04W 76/30; H04L 47/74
See application file for complete search history.

(56) References Cited

U.S. PATENT DOCUMENTS

| | | | |
|---|---|---|---|
| 2016/0295550 | A1 | 10/2016 | Sharma et al. |
| 2019/0007913 | A1 | 1/2019 | Tsai et al. |
| 2020/0052960 | A1* | 2/2020 | Song .................. H04W 8/183 |
| 2020/0128390 | A1* | 4/2020 | Lee .................... H04W 12/35 |
| 2020/0241947 | A1* | 7/2020 | Gonoji ............... G06F 11/0751 |
| 2020/0250045 | A1* | 8/2020 | Gudivada .......... G06F 11/1448 |

FOREIGN PATENT DOCUMENTS

| | | |
|---|---|---|
| CN | 103747493 A | 4/2014 |
| CN | 108966207 A | 12/2018 |
| CN | 108990122 A | 12/2018 |

OTHER PUBLICATIONS

ISA State Intellectual Property Office of the People's Republic of China, Written Opinion of the International Searching Authority Issued in Application No. PCT/CN2019/084276, Jan. 23, 2020, WIPO, (8 pages).
International Search Report Issued in Application No. PCT/CN2019/084276, Jan. 23, 2020 with English translation, (4p).
Extended European Search Report issued in Application No. 19926063.9, dated Nov. 2, 2022,(12p).
Intellectual property India, Office Action Issued in Application No. 202147053346, Apr. 18, 2022, (Submitted with Partial Machine Translation), (6p).

* cited by examiner

METHODS AND APPARATUSES FOR REPORTING ERROR CAUSE

CROSS-REFERENCE TO RELATED APPLICATION

This application is a U.S. national stage of International Application No. PCT/CN2019/084276 filed on Apr. 25, 2019, the disclosure of which is hereby incorporated by reference in its entirety.

TECHNICAL FIELD

The present disclosure relates to the field of communication and in particular to methods and apparatuses for reporting an error cause.

BACKGROUND

At present, there are more and more terminals capable of supporting multiple subscriber identification module (SIM) cards. A typical application scenario is illustrated below.

A commercial user has one private SIM card and one commercial SIM card, which are both placed in a same terminal; or, a common user has multiple private SIM cards and may select which SIM card is to be used based on service.

The multiple SIM cards supported by a same terminal may come from a same operator or different operators.

Sometimes, a terminal supporting multiple SIM cards may have the following problems.

Firstly, after a terminal has already establishes a radio resource control (RRC) connection with a corresponding base station through a first SIM card, when the terminal reads a paging message for paging a base station corresponding to a second SIM card or performs a corresponding measurement, a short interval of about 20 milliseconds between the terminal and the base station corresponding to the first SIM card will be generated. If the terminal supports multiple SIM cards, a cumulative long interval may be generated in each paging period.

Secondly, when deciding to switch to a cell corresponding to the second SIM card, the terminal needs to read corresponding system information, which may lead to a long interval of about 1 second between the terminal and the base station corresponding to the first SIM card. The base station corresponding to the first SIM card will regard it as an error. Till now, how the terminal and the base station will handle such situation is still pending.

Furthermore, when the terminal performs tracking area update (TAU) through the second SIM card, a longer time interval between the terminal and the base station corresponding to the first SIM card will be generated.

SUMMARY

Embodiments of the present disclosure provide methods and apparatuses for reporting an error cause.

According to a first aspect of embodiments of the present disclosure, a method of reporting an error cause is provided. The method is applied to a terminal supporting multiple subscriber identification module (SIM) cards. The method includes:

after establishing a radio resource control (RRC) connection with a first base station, detecting whether the RRC connection is disconnected due to execution of a target operation; wherein the first base station is a base station accessed by a first SIM card of the terminal, and the target operation is an operation executed by a second SIM card in an idle state in the terminal;

if the RRC connection is disconnected due to execution of the target operation, recording that a target error cause of disconnecting the RRC connection is resulted from the target operation;

after the target operation is completed, if a new RRC connection with the first base station is established, reporting the recorded target error cause to the first base station through the new RRC connection.

In some examples, after recording that the target error cause of disconnecting the RRC connection is resulted from the target operation, the method further includes:

reporting the target error cause to a non-access stratum of the terminal.

Reporting the recorded target error cause to the first base station includes:

reporting, by the non-access stratum, the recorded target error cause to the first base station.

In some examples, the target operation includes any one of:

reading a paging message from a second base station, reading a system message from the second base station, performing measurement and performing tracking area update.

The second base station is a base station to be accessed by the second SIM card.

According to a second aspect of embodiments of the present disclosure, a method of reporting an error cause is provided. The method is applied to a first base station and includes:

receiving a target error cause reported by a terminal supporting multiple subscriber identification module (SIM) cards through a first SIM card; wherein the target error cause indicates that the terminal previously disconnects a radio resource control (RRC) connection with the first base station due to a target operation, and the target operation is an operation executed by a second SIM card in an idle state in the terminal;

removing the target error cause from all error causes reported by the terminal;

performing recovery for other error causes than the removed target error cause.

In some examples, the target operation includes any one of:

reading a paging message from a second base station, reading a system message from the second base station, performing measurement and performing tracking area update.

The second base station is a base station to be accessed by the second SIM card.

According to a third aspect of embodiments of the present disclosure, an apparatus for reporting an error cause is provided. The apparatus is applied to a terminal supporting multiple subscriber identification module (SIM) cards and includes:

a detecting module, configured to, after a radio resource control (RRC) connection with a first base station is established, detect whether the RRC connection is disconnected due to execution of a target operation, wherein the first base station is a base station accessed by a first SIM card of the terminal, and the target operation is an operation executed by a second SIM card in an idle state in the terminal;

a recording module, configured to, if the RRC connection is disconnected due to execution of the target operation, record that a target error cause of disconnecting the RRC connection is resulted from the target operation;

a first reporting module, configured to, after the target operation is completed and if a new RRC connection with the first base station is established, report the recorded target error cause to the first base station through the new RRC connection.

In some examples, the apparatus further includes:

a second reporting module, configured to report the target error cause to a non-access stratum of the terminal.

The first reporting module includes:

a reporting sub-module, configured to report the recorded target error cause to the first base station through the non-access stratum.

In some examples, the target operation includes any one of:

reading a paging message from a second base station,
reading a system message from the second base station,
performing measurement and performing tracking area update.

The second base station is a base station to be accessed by the second SIM card.

According to a fourth aspect of embodiments of the present disclosure, an apparatus for reporting an error cause is provided. The apparatus is applied to a first base station and includes:

a receiving module, configured to receive a target error cause reported by a terminal supporting multiple subscriber identification module (SIM) cards through a first SIM card; wherein the target error cause indicates that the terminal previously disconnects a radio resource control (RRC) connection with the first base station due to a target operation, and the target operation is an operation executed by a second SIM card in an idle state in the terminal;

a first executing module, configured to remove the target error cause from all error causes reported by the terminal;

a second executing module, configured to perform recovery for other error causes than the removed target error cause.

In some examples, the target operation includes any one of:

reading a paging message from a second base station,
reading a system message from the second base station,
performing measurement and performing tracking area update.

The second base station is a base station to be accessed by the second SIM card.

According to a fifth aspect of embodiments of the present disclosure, a computer readable storage medium is provided. The computer readable storage medium stores computer programs which are configured to implement the method of reporting an error cause according to the above first aspect.

According to a sixth aspect of embodiments of the present disclosure, a computer readable storage medium is provided. The computer readable storage medium stores computer programs which are configured to implement the method of reporting an error cause according to the above second aspect.

According to a seventh aspect of embodiments of the present disclosure, an apparatus for reporting an error cause is provided. The apparatus is applied to a terminal supporting multiple subscriber identification module (SIM) cards and includes:

a processor;

a memory storing instructions executable by the processor;

where the processor is configured to:

after a radio resource control (RRC) connection with a first base station is established, detect whether the RRC connection is disconnected due to execution of a target operation, wherein the first base station is a base station accessed by a first SIM card of the terminal, and the target operation is an operation executed by a second SIM card in an idle state in the terminal;

if the RRC connection is disconnected due to execution of the target operation, record that a target error cause of disconnecting the RRC connection is resulted from the target operation;

after the target operation is completed, if a new RRC connection with the first base station is established, report the recorded target error cause to the first base station through the new RRC connection.

According to an eighth aspect of embodiments of the present disclosure, an apparatus for reporting an error cause is provided. The apparatus is applied to a first base station and includes:

a processor;

a memory, storing instructions executable by the processor;

where the processor is configured to:

receive a target error cause reported by a terminal supporting multiple subscriber identification module (SIM) cards through a first SIM card; where the target error cause indicates that the terminal previously disconnects a radio resource control (RRC) connection with the base station due to a target operation, and the target operation is an operation executed by a second SIM card in an idle state in the terminal;

remove the target error cause from all error causes reported by the terminal;

perform recovery for other error causes than the removed target error cause.

The technical solutions according to the embodiments of the present disclosure have the following beneficial effects.

In the embodiments of the present disclosure, a terminal supporting multiple SIM cards records a target error cause of disconnecting an RRC connection with the first base station due to a target operation, and reports the target error cause to the first base station after completing the target operation and establishing a new RRC connection with the first base station. In this way, the first base station will no longer perform recovery for the target error cause, thus reducing network errors statistics.

In the embodiments of the present disclosure, the target operation executed by the second SIM card in an idle state in the terminal may include any one of reading a paging message from a second base station, reading a system message from the second base station, performing measurement and performing tracking area update. Because the terminal disconnects the RRC connection with the first base station due to execution of the above target operation, the terminal may record the target error cause to avoid triggering the first base station to perform a recovery mechanism for the target operation subsequently.

In the embodiments of the present disclosure, the terminal may report the recorded target error cause to a non-access stratum of the terminal, and subsequently report the target error cause to the first base station through the non-access stratum after re-establishing a new RRC connection with the first base station, leading to high availability.

In the embodiments of the present disclosure, after receiving the target error cause reported by the terminal supporting multiple SIM cards, the first base station may remove the target error cause from all error causes reported by the terminal, and thus perform recovery only for other error causes. In the above process, the number of times that the first base station performs recovery for the target error cause is eliminated, thereby reducing network errors statistics.

It should be understood that the above general descriptions and the subsequent detailed descriptions are merely illustrative and explanatory rather than limiting of the present disclosure.

BRIEF DESCRIPTION OF THE DRAWINGS

The accompanying drawings, which are incorporated in and constitute a part of the present description, illustrate embodiments consistent with the present disclosure and serve to explain the principles of the present disclosure together with the description.

DETAILED DESCRIPTION OF THE EMBODIMENTS

Exemplary embodiments will be described in detail herein, with the illustrations thereof represented in the drawings. When the following descriptions involve the drawings, like numerals in different drawings refer to like or similar elements unless otherwise indicated. The implementations described in the following embodiments do not represent all implementations consistent with the present disclosure. Rather, they are merely examples of apparatuses and methods consistent with some aspects of the present disclosure.

The terms used in the present disclosure are for the purpose of describing particular embodiments only, and are not intended to limit the present disclosure. The terms "a", "the" and "said" in their singular forms in the present disclosure and the appended claims are also intended to include plurality, unless clearly indicated otherwise in the context. It should also be understood that the term "and/or" as used herein refers to and includes any and all possible combinations of one or more of the associated listed items.

It is to be understood that although different information may be described using the terms such as first, second, third, etc. in the present disclosure, these information should not be limited to these terms. These terms are used only to distinguish the same type of information from each other. For example, without departing from the scope of the present disclosure, the first information may also be referred to as the second information, and similarly, the second information may also be referred to as the first information. Depending on the context, the word "if" as used herein may be interpreted as "when" or "as" or "determining in response to".

A method of reporting an error cause according to an embodiment of the present disclosure is firstly introduced below from a terminal side.

Figure 1:
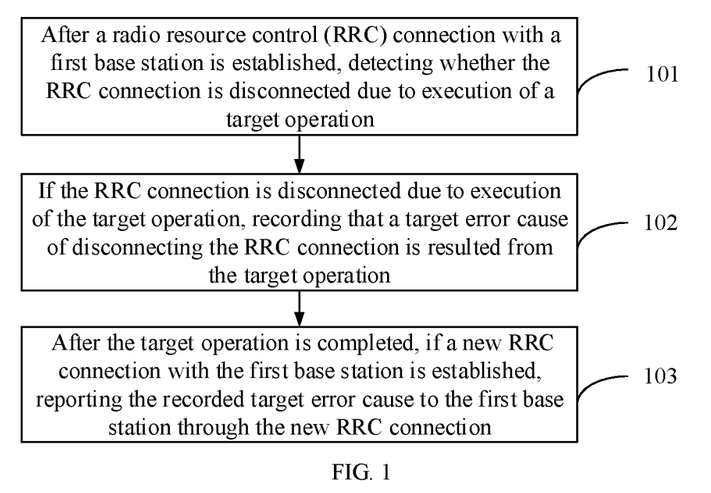
FIG. 1 is a schematic flowchart illustrating a method of reporting an error cause according to an embodiment of the present disclosure.

An embodiment of the present disclosure provides a method of reporting an error cause, which may be applied to a terminal supporting multiple subscriber identification module (SIM) cards. FIG. 1 is a flowchart illustrating a method of reporting an error cause according to an embodiment of the present disclosure. The method may include the following steps.

At step 101, after a radio resource control (RRC) connection with a first base station is established, whether the RRC connection is disconnected due to execution of a target operation is detected.

The first base station is a base station accessed by a first SIM card of the terminal, and the target operation is an operation executed by a second SIM card in an idle state in the terminal.

At step 102, if the RRC connection is disconnected due to execution of the target operation, it is recorded that a target error cause of disconnecting the RRC connection is resulted from the target operation.

At step 103, after the target operation is completed, if a new RRC connection with the first base station is established, the recorded target error cause is reported to the first base station through the new RRC connection.

In the above embodiment, the terminal supporting multiple SIM cards records the target error cause of disconnecting the RRC connection with the first base station due to the target operation, and reports the target error cause to the first base station after completing the target operation and establishing the new RRC connection with the first base station. In this way, the first base station will no longer perform recovery for the target error cause, thus reducing network errors statistics.

For the above step 101, if the terminal supporting multiple SIM cards already establishes a RRC connection with the first base station through the first SIM card, when the terminal detects that the RRC connection with the first base station is disconnected, the terminal may determine whether the disconnection is resulted from execution of the target operation.

The target operation is an operation executed by the second SIM card which is in an idle state and different from the first SIM card in the terminal. In some examples, the target operation may be an operation performed by the terminal to read a paging message from a second base station to be accessed by the second SIM card, or an operation for reading a system message from the second base station, or a measurement operation performed by using the second SIM card, or a tracking area update (TAU) operation performed by using the second SIM card.

The first SIM card and the second SIM card may belong to a same operator or different operators, which is not limited herein.

For the above step 102, if the terminal determines that the RRC connection with the first base station is disconnected due to execution of the target operation, the terminal may record that the target error cause of disconnecting the RRC connection is resulted from the target operation.

For the above step 103, if the terminal completes the target operation and re-establishes a new RRC connection with the first base station, the terminal may report the previous target error cause to the first base station through the new RRC connection.

After receiving the target error cause, the first base station may remove the target error cause from all error causes reported by the terminal and perform recovery only for other error causes based on a recovery mechanism.

Figure 2:
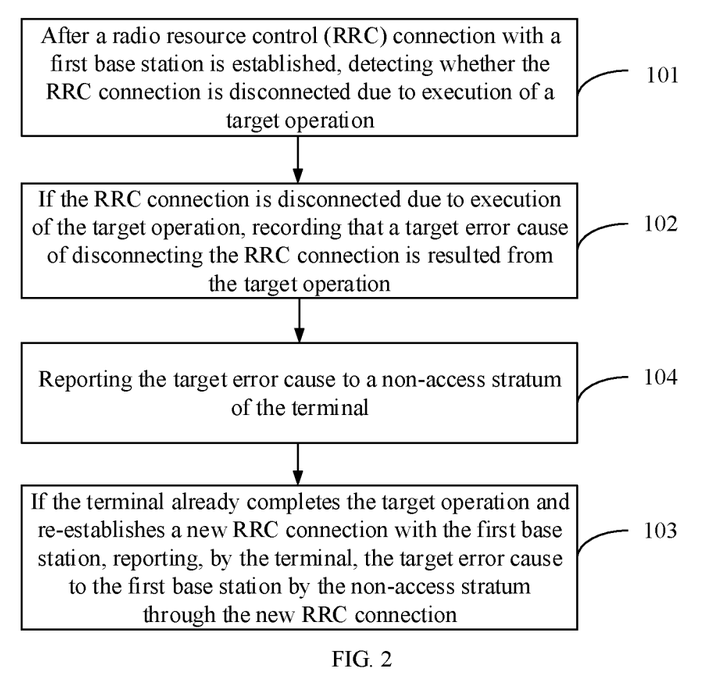
FIG. 2 is a schematic flowchart illustrating another method of reporting an error cause according to an embodiment of the present disclosure.

On basis of FIG. 1, FIG. 2 is a flowchart illustrating another method of reporting an error cause according to an embodiment of the present disclosure. In an embodiment, after step 102 is completed, the method further includes step 104.

At step 104, the target error cause is reported to a non-access stratum of the terminal.

In this step, the terminal may report the target error cause to a high layer of the terminal, for example, the non-access stratum (NAS), after recording the target error cause.

Correspondingly, the step 103 may specifically includes:
reporting, by the non-access stratum, the recorded target error cause to the first base station.

In the above embodiment, the terminal may report the target error cause to the non-access stratum of the terminal, and subsequently report the target error cause to the first base station through the non-access stratum after re-establishing a new RRC connection with the first base station, which brings about high availability.

A method of reporting an error cause according to an embodiment of the present disclosure is introduced below from a base station side.

Figure 3:
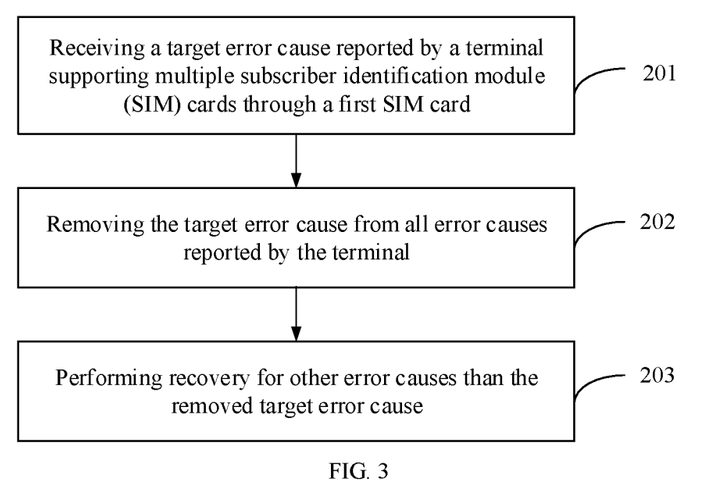
FIG. 3 is a schematic flowchart illustrating another method of reporting an error cause according to an embodiment of the present disclosure.

Based on the above method of reporting an error cause, an embodiment of the present disclosure further provides a method of reporting an error cause, which may be applied to a base station. The base station herein may be a first base station accessed by a first SIM card of a terminal. FIG. 3 is a flowchart illustrating a method of reporting an error cause according to an embodiment of the present disclosure. The method may include the following steps.

At step 201, a target error cause reported by a terminal supporting multiple subscriber identification module (SIM) cards through a first SIM card is received.

The target error cause indicates that the terminal previously disconnects a radio resource control (RRC) connection with the base station due to a target operation, where the target operation is an operation executed by a second SIM card in an idle state in the terminal.

At step 202, the target error cause is removed from all error causes reported by the terminal.

At step 203, recovery is performed for other error causes than the removed target error cause.

In the above embodiment, after receiving the target error cause reported by the terminal supporting multiple SIM cards, the first base station may remove the target error cause from all error causes reported by the terminal, and thus perform recovery only for other error causes. In the above process, the number of times that the first base station performs recovery for the target error cause is eliminated, thereby reducing network errors statistics.

For the above step 201, after completing the target operation and re-establishing a new RRC connection with the first base station, the terminal may report the target error cause to the first base station by the NAS through the new RRC connection and the first base station directly receives the target error cause.

The target operation may be an operation executed by the second SIM card which is in an idle state and different from the first SIM card in the terminal. In some examples, the target operation may be an operation for reading a paging message from a second base station to be accessed by the second SIM card, or an operation for reading a system message from the second base station, or a measurement operation performed by using the second SIM card, or a tracking area update (TAU) operation performed by using the second SIM card.

For the above step 202, the first base station may remove the target error cause from all error causes reported by the terminal during a detection period of a preset time length.

For the above step 203, the first base station will no longer performs recovery for the RRC connection between the first base station and the terminal for the target error cause but for other error causes than the target error cause. Sometimes, the recovery is performed based on a recovery mechanism.

Figure 4:
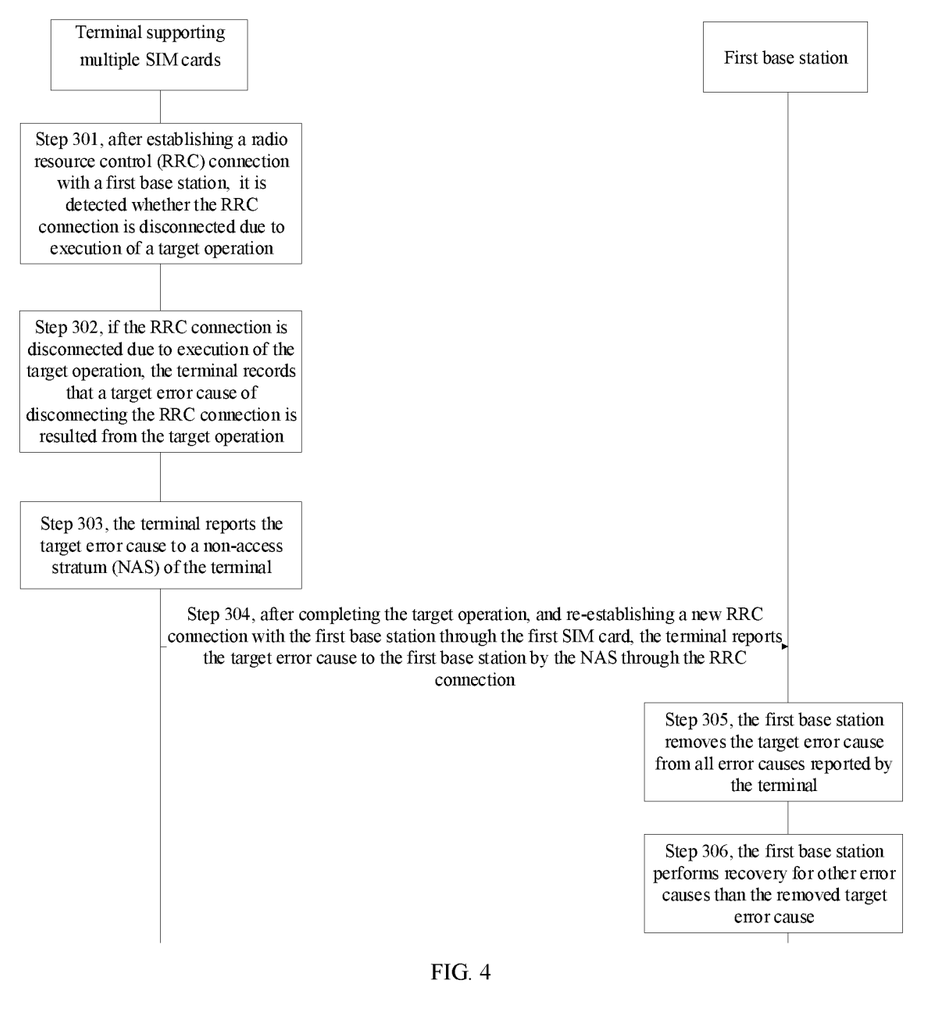
FIG. 4 is a schematic flowchart illustrating another method of reporting an error cause according to an embodiment of the present disclosure.

FIG. 4 is a flowchart illustrating a method of reporting an error cause according to an embodiment of the present disclosure. In an embodiment, the method includes the following steps.

At step 301, after establishing a radio resource control (RRC) connection with a first base station, a terminal supporting multiple subscriber identification module (SIM) cards detects whether the RRC connection is disconnected due to execution of a target operation.

The first base station is a base station accessed by a first SIM card of the terminal, and the target operation is an operation executed by a second SIM card in an idle state in the terminal.

The target operation may include any one of reading a paging message from a second base station, reading a system message from the second base station, performing measurement and performing tracking area update. The second base station is a base station to be accessed by the second SIM card.

At step 302, if the RRC connection is disconnected due to execution of the target operation, the terminal records that a target error cause of disconnecting the RRC connection is resulted from the target operation.

At step 303, the terminal reports the target error cause to a non-access stratum (NAS) of the terminal.

At step 304, after completing the target operation, and re-establishing a new RRC connection with the first base station through the first SIM card, the terminal reports the target error cause to the first base station by the NAS through the RRC connection.

At step 305, the first base station removes the target error cause from all error causes reported by the terminal.

At step 306, the first base station performs recovery for other error causes than the removed target error cause.

In the above embodiment, the terminal records the target error cause of disconnecting the RRC connection with the first base station due to the target operation, and reports the target error cause to the first base station by the NAS through a new RRC connection after completing the target operation and establishing the new RRC connection with the first base station. The first base station removes the target error cause from all error causes reported by the terminal and performs recovery only for other error causes, thus eliminating the number of times that the first base station performs recovery for the target error cause and reducing the network errors statistics.

Corresponding to the above method embodiments for realizing application functions, the present disclosure further provides embodiments of an apparatus for realizing application function and corresponding sender and receiver.

Figure 5:
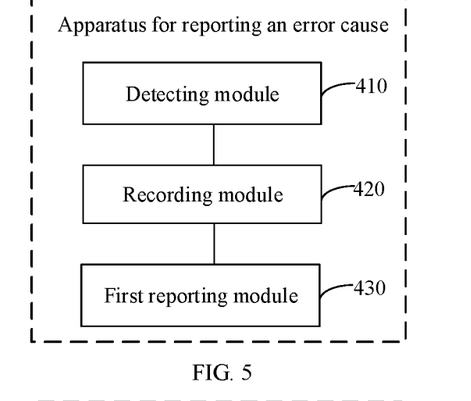
FIG. 5 is a block diagram illustrating an apparatus for reporting an error cause according to an embodiment of the present disclosure.

FIG. 5 is a block diagram illustrating an apparatus for reporting an error cause according to an embodiment of the present disclosure. The apparatus is applied to a terminal supporting multiple subscriber identification module (SIM) cards, and includes:

a detecting module 410, configured to, after a radio resource control (RRC) connection with a first base station is established, detect whether the RRC connection is disconnected due to execution of a target operation, wherein the first base station is a base station accessed by a first SIM card of the terminal, and the target operation is an operation executed by a second SIM card in an idle state in the terminal;

a recording module 420, configured to, if the RRC connection is disconnected due to execution of the target operation, record that a target error cause of disconnecting the RRC connection is resulted from the target operation;

a first reporting module 430, configured to, after the target operation is completed and if a new RRC connection with the first base station is established, report the recorded target error cause to the first base station through the new RRC connection.

Figure 6:
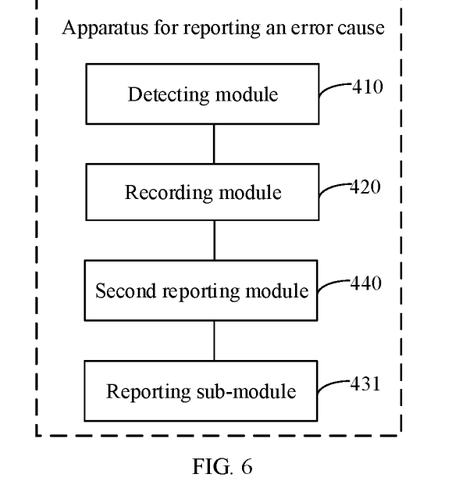
FIG. 6 is a block diagram illustrating another apparatus for reporting an error cause according to an embodiment of the present disclosure.

FIG. 6 is a block diagram illustrating another apparatus for reporting an error cause based on the embodiment shown in FIG. 5. The apparatus further includes:

a second reporting module 440, configured to report the target error cause to a non-access stratum (NAS) of the terminal.

The first reporting module 430 includes:

a reporting sub-module 431, configured to report the recorded target error cause to the first base station through the NAS.

In some examples, the target operation includes any one of:

reading a paging message from a second base station, reading a system message from the second base station, performing measurement and performing tracking area update.

The second base station is a base station to be accessed by the second SIM card.

Figure 7:
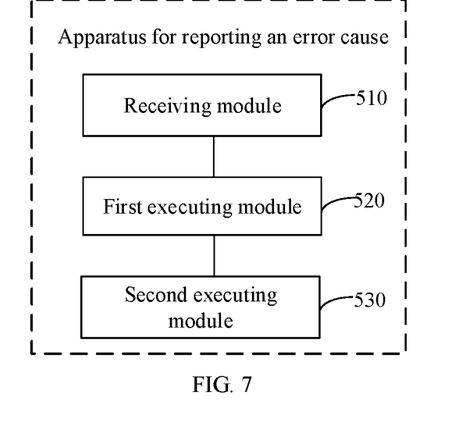
FIG. 7 is a block diagram illustrating another apparatus for reporting an error cause according to an embodiment of the present disclosure.

FIG. 7 is a block diagram illustrating another apparatus for reporting an error cause according to an embodiment of the present disclosure. The apparatus is applied to a first base station and includes:

a receiving module 510, configured to receive a target error cause reported by a terminal supporting multiple subscriber identification module (SIM) cards through a first SIM card; wherein the target error cause indicates that the terminal previously disconnects a radio resource control (RRC) connection with the base station due to a target operation, and the target operation is an operation executed by a second SIM card in an idle state in the terminal;

a first executing module 520, configured to remove the target error cause from all error causes reported by the terminal;

a second executing module 530, configured to perform recovery for other error causes than the removed target error cause.

In some examples, the target operation includes any one of:

reading a paging message from a second base station, reading a system message from the second base station, performing measurement and performing tracking area update.

The second base station is a base station to be accessed by the second SIM card.

Since the apparatus embodiments substantially correspond to the method embodiments, a reference may be made to part of the descriptions of the method embodiments for the related part. The apparatus embodiments described above are merely illustrative, where the units described as separate members may be or not be physically separated, and the members displayed as units may be or not be physical units, i.e., may be located in one place, or may be distributed to a plurality of network units. Part or all of the modules may be selected according to actual requirements to implement the objectives of the solutions in the embodiments. Those of ordinary skill in the art may understand and carry out them without creative work.

Correspondingly, the present disclosure further provides a computer readable storage medium storing computer programs. The computer programs are configured to implement any one of the above methods of reporting an error cause at the side of the terminal supporting multiple SIM cards.

Correspondingly, the present disclosure further provides a computer readable storage medium storing computer programs. The computer programs are configured to implement any one of the above methods of reporting an error cause at the side of the first base station.

Correspondingly, the present disclosure further provides an apparatus for reporting an error cause. The apparatus is applied to a terminal supporting multiple subscriber identification module (SIM) cards and includes:

a processor;
a memory storing instructions executable by the processor;
wherein the processor is configured to:
after a radio resource control (RRC) connection with a first base station is established, detect whether the RRC connection is disconnected due to execution of a target operation, wherein the first base station is a base station accessed by a first SIM card of the terminal, and the target operation is an operation executed by a second SIM card in an idle state in the terminal;
if the RRC connection is disconnected due to execution of the target operation, record that a target error cause of disconnecting the RRC connection is resulted from the target operation;
after the target operation is completed, if a new RRC connection with the first base station is established, report the recorded target error cause to the first base station through the new RRC connection.

Figure 8:
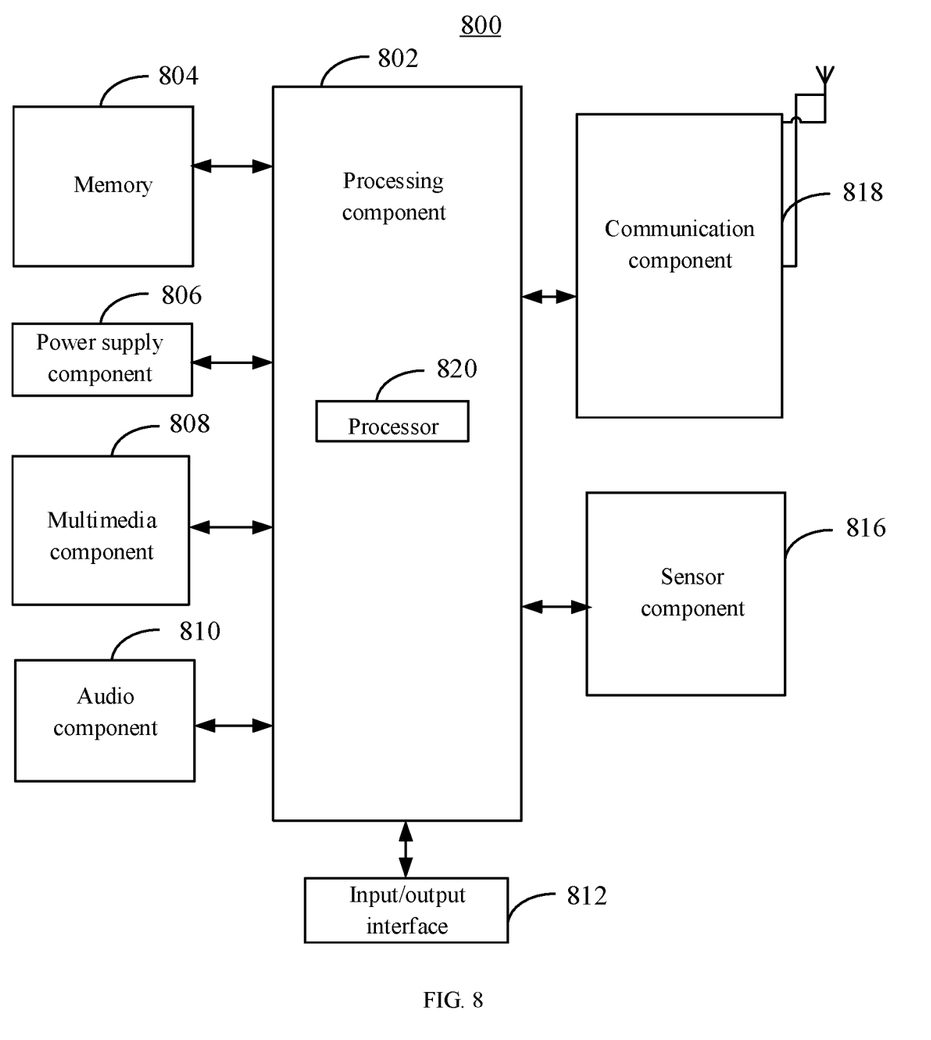
FIG. 8 is a structural schematic diagram illustrating an apparatus for reporting an error cause according to an embodiment of the present disclosure.

FIG. 8 is a block diagram illustrating an electronic device 800 supporting multiple subscriber identification module (SIM) cards according to an embodiment of the present disclosure. For example, the electronic device 800 may be smart phone, tablet computer, electronic book reader, multimedia player, wearable device and vehicle-mounted terminal and the like.

As shown in FIG. 8, the electronic device 800 may include one or more of a processing component 802, a memory 804, a power supply component 806, a multimedia component 808, an audio component 810, an input/output (I/O) interface 812, a sensor component 816, and a communication component 818.

The processing component 802 usually controls overall operations of the electronic device 800, such as operations associated with displaying, phone call, data communication, camera operation, and recording operation. The processing component 802 may include one or more processor 802 to execute instructions to complete all or part of the steps of the above methods. Further, the processing component 802 may include one or more modules to facilitate interaction between the processing component 802 and other components. For example, the processing component 802 may include a multimedia module to facilitate interaction between the multimedia component 808 and the processing component 802. For another example, the processing component 802 may read executable instructions from the memory to implement the steps of the method of reporting an error cause according to the above embodiments.

The memory 804 is configured to store various types of data to support the operation of the electronic device 800. Examples of such data include instructions for any application or method operated on the electronic device 800, contact data, phonebook data, messages, pictures, videos, and so on. The memory 804 may be implemented by any type of volatile or non-volatile storage devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or compact disk.

The power supply component 806 supplies power for different components of the electronic device 800. The power supply component 806 may include a power supply management system, one or more power supplies, and other components associated with generating, managing and distributing power for the electronic device 800.

The multimedia component 808 includes a screen that provides an output interface between the electronic device 800 and a user. In some embodiments, the multimedia component 808 includes a front camera and/or a rear camera. When the electronic device 800 is in an operation mode, such as a shooting mode or a video mode, the front camera and/or the rear camera may receive external multimedia data. Each of the front and rear cameras may be a fixed optical lens system or have a focal length and an optical zoom capability.

The audio component 810 is configured to output and/or input audio signals. For example, the audio component 810 includes a microphone (MIC) configured to receive an external audio signal when the electronic device 800 is in an operation mode, such as a call mode, a recording mode, and a voice recognition mode. The received audio signal may be further stored in the memory 804 or transmitted via the communication component 818. In some embodiments, the audio component 810 also includes a loudspeaker for outputting an audio signal.

The I/O interface 812 provides an interface between the processing component 802 and a peripheral interface module which may be a keyboard, a click wheel, a button, or the like. These buttons may include, but are not limited to a home button, a volume button, a start button, and a lock button.

The sensor component 816 includes one or more sensors for providing a status assessment in various aspects to the electronic device 800. For example, the sensor component 816 may detect an open/closed state of the electronic device 800, and the relative positioning of components, for example, the component is a display and a keypad of the electronic device 800. The sensor component 816 may also detect a change in position of the electronic device 800 or a component of the electronic device 800, the presence or absence of contact between a user and the electronic device 800, the orientation or acceleration/deceleration of the electronic device 800 and a change in temperature of the electronic device 800. The sensor component 816 may include a proximity sensor configured to detect the presence of nearby objects without any physical contact. The sensor component 816 may also include a light sensor, such as a CMOS or CCD image sensor, for use in imaging applications. In some embodiments, the sensor component 816 may also include an acceleration sensor, a gyro sensor, a magnetic sensor, a pressure sensor, or a temperature sensor.

The communication component 818 is configured to facilitate wired or wireless communication between the electronic device 800 and other devices. The electronic device 800 may access a wireless network based on a communication standard, such as WiFi, 2G, 3G, 4G or 5G or a combination thereof. In an embodiment, the communication component 818 receives broadcast signals or broadcast associated information from an external broadcast management system via a broadcast channel. In an embodiment, the communication component 818 also includes a near field communication (NFC) module to facilitate short range communication. For example, the NFC module may be implemented based on a radio frequency identification (RFID) technology, an infrared data association (IrDA) technology, an ultrawide band (UWB) technology, a Bluetooth (BT) technology, and other technologies.

In an embodiment, the electronic device 800 may be implemented by one or more application specific integrated circuits (ASICs), digital signal processors (DSPs), digital signal processing devices (DSPDs), programmable logic devices (PLDs), a field programmable gate array (FPGA), a controller, a microcontroller, a microprocessor or other electronic elements for performing the above methods.

In an embodiment, there is further provided a non-transitory computer readable storage medium including instructions, for example, the memory 804 including instructions. The above instructions may be executed by the processor 820 of the electronic device 800 to implement the above method of reporting an error cause. For example, the non-transitory computer readable storage medium may be a read only memory (ROM), a random access memory (RAM), a CD-ROM, a magnetic tape, floppy disk, or optical data storage device or the like.

Correspondingly, the present disclosure further provides an apparatus for reporting an error cause. The apparatus is applied to a first base station and includes:
a processor;
a memory, storing instructions executable by the processor;
wherein the processor is configured to:
receive a target error cause reported by a terminal supporting multiple subscriber identification module (SIM) cards through a first SIM card; wherein the target error cause indicates that the terminal previously disconnects a radio resource control (RRC) connection with the base station due to a target operation, and the target operation is an operation executed by a second SIM card in an idle state in the terminal;
remove the target error cause from all error causes reported by the terminal;
perform recovery for other error causes than the removed target error cause.

Figure 9:
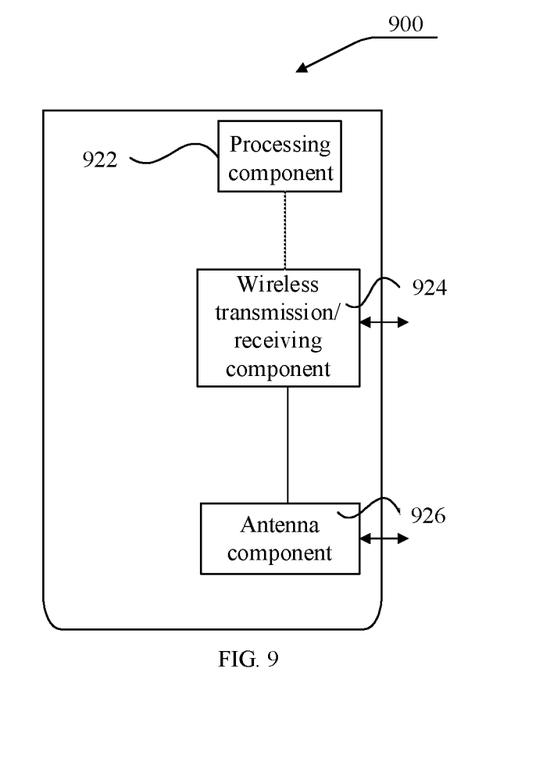
FIG. 9 is a structural schematic diagram illustrating another apparatus for reporting an error cause according to an embodiment of the present disclosure.

FIG. 9 is a structural schematic diagram illustrating an apparatus 900 for reporting an error cause according to an embodiment of the present disclosure. The apparatus 900 may be provided as a base station. As shown in FIG. 9, the apparatus 900 includes a processing component 922, a wireless transmission/receiving component 924, an antenna component 926, and signal processing part specific to a wireless interface. The processing component 922 may further include one or more processors.

One processor of the processing component 922 may be configured to implement any one of the above methods of reporting an error cause at the side of the first base station.

The present disclosure may include dedicated hardware implementations such as disclosure specific integrated circuits, programmable logic arrays and other hardware devices. The hardware implementations can be constructed to implement one or more of the methods described herein. Examples that may include the apparatus and systems of various implementations can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

Other implementations of the present disclosure will be apparent to those skilled in the art from consideration of the specification and practice of the present disclosure herein. The present disclosure is intended to cover any variations, uses, modification or adaptations of the present disclosure that follow the general principles thereof and include common knowledge or conventional technical means that are not disclosed in the present disclosure. The specification and embodiments are considered as exemplary only.

It is to be understood that the present disclosure is not limited to the precise structure described above and shown in the accompanying drawings, and that various modifications and changes may be made without departing from the scope thereof.

What is claimed is:

1. A method of reporting an error cause, the method being applied to a terminal supporting multiple subscriber identification module (SIM) cards, and comprising:
   after establishing a radio resource control (RRC) connection with a first base station, detecting whether the RRC connection is disconnected due to execution of a target operation; wherein the first base station is a base station accessed by a first SIM card of the terminal, and the target operation is an operation executed by a second SIM card in an idle state in the terminal;
   if the RRC connection is disconnected due to execution of the target operation, recording that a target error cause of disconnecting the RRC connection is resulted from the target operation;
   reporting the target error cause to a non-access stratum of the terminal;
   after the target operation is completed, if a new RRC connection with the first base station is established, reporting, by the non-access stratum, the recorded target error cause to the first base station through the new RRC connection.

2. The method of claim 1, wherein the target operation comprises any one of:
   reading a paging message from a second base station, reading a system message from the second base station, performing measurement and performing tracking area update;
   wherein the second base station is a base station to be accessed by the second SIM card.

3. A method of reporting an error cause, the method being applied to a first base station, and comprising:
   receiving a target error cause reported by a terminal supporting multiple subscriber identification module (SIM) cards through a first SIM card; wherein the target error cause indicates that the terminal previously disconnects a radio resource control (RRC) connection with the first base station due to a target operation, and the target operation is an operation executed by a second SIM card in an idle state in the terminal;
   removing the target error cause from all error causes reported by the terminal;
   performing recovery for other error causes than the removed target error cause,
   wherein the target error cause is reported by a non-access stratum of the terminal via a new RRC connection established between the first base station and the first SIM card after the target operation is completed.

4. The method of claim 3, wherein the target operation comprises any one of:
   reading a paging message from a second base station, reading a system message from the second base station, performing measurement and performing tracking area update;
   wherein the second base station is a base station to be accessed by the second SIM card.

5. An apparatus for reporting an error cause, the apparatus being applied to a terminal supporting multiple subscriber identification module (SIM) cards and comprising:
   a processor;
   a memory, storing instructions executable by the processor;
   wherein the processor is configured to:
   after a radio resource control (RRC) connection with a first base station is established, detect whether the RRC connection is disconnected due to execution of a target operation, wherein the first base station is a base station accessed by a first SIM card of the terminal, and the target operation is an operation executed by a second SIM card in an idle state in the terminal;
   if the RRC connection is disconnected due to execution of the target operation, record that a target error cause of disconnecting the RRC connection is resulted from the target operation;
   report the target error cause to a non-access stratum of the terminal;
   after the target operation is completed, if a new RRC connection with the first base station is established, report, by the non-access stratum, the recorded target error cause to the first base station through the new RRC connection.

6. An apparatus for reporting an error cause, the apparatus being applied to a first base station, and comprising:
   a processor;
   a memory, storing instructions executable by the processor;

wherein the processor is configured to:
receive a target error cause reported by a terminal supporting multiple subscriber identification module (SIM) cards through a first SIM card; wherein the target error cause indicates that the terminal previously disconnects a radio resource control (RRC) connection with the first base station due to a target operation, and the target operation is an operation executed by a second SIM card in an idle state in the terminal;
remove the target error cause from all error causes reported by the terminal;
perform recovery for other error causes than the removed target error cause,
wherein the target error cause is reported by a non-access stratum of the terminal via a new RRC connection established between the first base station and the first SIM card after the target operation is completed.

7. The apparatus of claim 5, wherein the target operation comprises any one of:
reading a paging message from a second base station, reading a system message from the second base station, performing measurement and performing tracking area update;
wherein the second base station is a base station to be accessed by the second SIM card.

* * * * *